US012697868B1

(12) United States Patent
Zeng

(10) Patent No.: US 12,697,868 B1
(45) Date of Patent: Aug. 4, 2026

(54) FUEL SUPPLY DEVICE

(71) Applicant: Yechao Zeng, Guangdong (CN)

(72) Inventor: Yechao Zeng, Guangdong (CN)

( * ) Notice: Subject to any disclaimer, the term of this patent is extended or adjusted under 35 U.S.C. 154(b) by 0 days.

(21) Appl. No.: 19/318,483

(22) Filed: Sep. 4, 2025

(51) Int. Cl.
B60K 15/035 (2006.01)
B60K 15/01 (2006.01)

(52) U.S. Cl.
CPC ........ B60K 15/03519 (2013.01); B60K 15/01 (2013.01)

(58) Field of Classification Search
USPC ......................................................... 222/375
See application file for complete search history.

(56) References Cited

U.S. PATENT DOCUMENTS

| | | | | |
|---|---|---|---|---|
| 5,139,278 | A * | 8/1992 | Vlasicak | B67D 7/845 220/86.1 |
| 5,472,124 | A * | 12/1995 | Martushev | B65D 1/18 222/530 |
| 5,597,097 | A * | 1/1997 | Morris | B67D 7/005 222/530 |
| 5,667,113 | A * | 9/1997 | Clarke | B67D 7/845 222/530 |
| 11,408,383 | B2 * | 8/2022 | Fisch | F02M 37/12 |
| 11,631,912 | B2 * | 4/2023 | Hori | F25D 23/006 429/62 |
| 11,772,848 | B2 * | 10/2023 | Fisher | B65D 25/28 222/143 |
| 12,304,803 | B1 * | 5/2025 | Lee | B67D 7/04 |
| 12,473,192 | B1 * | 11/2025 | Le | B67D 7/3209 |

| | | | | |
|---|---|---|---|---|
| 2006/0086411 | A1 * | 4/2006 | Luca | B67D 7/84 141/284 |
| 2019/0002195 | A1 * | 1/2019 | Cox, I | B65D 90/48 |
| 2019/0106314 | A1 * | 4/2019 | Shaw | B65D 85/84 |
| 2019/0248552 | A1 * | 8/2019 | Olarte | B65D 1/0261 |
| 2020/0055491 | A1 * | 2/2020 | Van Wyk | B67D 7/04 |
| 2021/0075235 | A1 * | 3/2021 | Nook | F02N 11/14 |
| 2021/0095585 | A1 * | 4/2021 | Schiefer | F02M 37/44 |
| 2022/0063868 | A1 * | 3/2022 | Fisher | B65D 25/20 |
| 2022/0260299 | A1 * | 8/2022 | Hori | F25D 29/003 |
| 2023/0084518 | A1 * | 3/2023 | Kull | A47L 9/122 15/347 |
| 2025/0229282 | A1 * | 7/2025 | Cirincione, II | B67D 7/845 |
| 2025/0229946 | A1 * | 7/2025 | Li | F04B 23/025 |
| 2025/0229948 | A1 * | 7/2025 | Li | B65D 25/2894 |
| 2025/0230031 | A1 * | 7/2025 | Snyder | B67D 7/84 |
| 2025/0230807 | A1 * | 7/2025 | Li | F04B 43/04 |
| 2025/0230808 | A1 * | 7/2025 | Lockhart | F04B 49/065 |
| 2025/0233254 | A1 * | 7/2025 | Li | H01M 50/271 |

FOREIGN PATENT DOCUMENTS

WO WO-2009033277 A1 * 3/2009 ............. B67D 7/005

* cited by examiner

*Primary Examiner* — Paul R. Durand
*Assistant Examiner* — Michael J. Melargano
(74) *Attorney, Agent, or Firm* — Hawaii Patent Services; Nathaniel K. Fedde; Kenton N. Fedde

(57) ABSTRACT

The present disclosure relates to a fuel supply device, comprising a fuel tank, a controller, a base and a fuel nozzle. The controller is connected to the mounting part of the fuel tank through an elastic engagement unit: the elastic engagement unit includes a pre-compressed elastic element and a boss. During installation, pressing the controller causes the boss to retract and snap into the recessed groove, while the elastic element releases radial resilience force to drive the boss to continuously press against the groove wall, forming a vibration-resistant self-locking fixation.

20 Claims, 16 Drawing Sheets

253

250

254

252

210

111

240

170

161

172

163

FUEL SUPPLY DEVICE

TECHNICAL FIELD

The present disclosure relates to the technical field of fuel tanks, particularly to a fuel supply device.

BACKGROUND

In industrial production and daily life, fuel tanks are widely used, especially in mobile refueling scenarios. Fuel is typically first injected into the fuel tank from a gas station or oil drum, and after the fuel tank is moved to the target location, it supplies fuel to the corresponding equipment.

To achieve intelligent control of fuel discharge from the fuel tank, controllers are commonly installed in existing fuel tanks to regulate automatic fluid discharge. For example, a fuel tank disclosed in U.S. Patent (U.S. Pat. No. 18,775,438) realizes intelligent control of fluid discharge through an electronic box.

However, most control modules (such as the aforementioned electronic box or controller) in current fuel tanks are typically secured using screws or threaded connections. This fixation method not only increases material input and manufacturing costs in production but, more critically, is highly prone to loosening or even detachment due to factors like equipment vibration and component wear during long-term use, severely compromising the reliability of control module fixation. This may lead to risks such as fuel leakage or control failure. Additionally, during installation, workers frequently require screwdriver operations, which not only complicates the process but also significantly reduces installation efficiency, creating numerous practical inconveniences.

SUMMARY

The present disclosure provides a fuel supply device to address the issues raised in the background above.

To achieve the aforementioned object, the present disclosure adopts the following technical solution:

A fuel supply device comprises a fuel tank provided with a mounting part, wherein the mounting part has at least one recessed groove; and a controller arranged within the mounting part, comprising a base and at least one elastic engagement unit. The elastic engagement unit comprises an elastic element and a boss driven by the elastic element. The controller is detachably fixed to the mounting part by snapping the boss into the recessed groove, and the elastic element generates a continuous resilience force after the boss is snapped into the recessed groove, ensuring tight contact between the boss and the recessed groove to achieve self-tightening fixation.

The present disclosure further provides another technical solution: a fuel supply device, comprising: a fuel tank provided with a mounting part, wherein the mounting part has at least one recessed groove; and a controller arranged within the mounting part, comprising a base. At least one fixed chamber is provided on an inner bottom wall of the base, and an elastic sheet is arranged inside the fixed chamber. Extended holes are arranged on both sides of the base, and the elastic sheet is fixedly provided with a boss that movably passes through the extended holes and is partially exposed to the outside. The controller is pressed to radially retract the boss until the boss is snapped into the recessed groove, thereby completing installation, while the elastic sheet releases a resilience force after the boss is snapped into the recessed groove, driving the boss to continuously press against a side wall of the recessed groove, forming a self-locking fixation.

The beneficial effects of the present disclosure compared to the prior art are as follows: The use of an elastic sheet, boss, and recessed groove snap-fit structure replaces traditional screw or threaded fixation methods, enabling quick installation and removal of the controller without tools. This addresses the high cost of existing fixation methods while avoiding the operational complexity caused by frequent screwdriver use, significantly improving assembly efficiency and long-term structural stability. After the boss is snapped into the recessed groove, the elastic sheet generates a continuous resilience force due to deformation, consistently applying an outward thrust to the boss, ensuring tight contact between the boss and the inner wall of the recessed groove, forming a self-tightening fixation. In vibration or impact environments, the deformation of the elastic sheet can buffer external forces, preventing gaps caused by rigid collisions between the boss and the recessed groove, ensuring stable connection. This solves the issues of traditional threaded connections lacking active preload and being prone to loosening under external forces.

BRIEF DESCRIPTION OF DRAWINGS

The drawings, which form part of this application, are provided to further illustrate the present disclosure. The illustrative embodiments and the descriptions thereof are intended to explain the present disclosure and do not constitute undue limitations. In the drawings.

Figure 1:
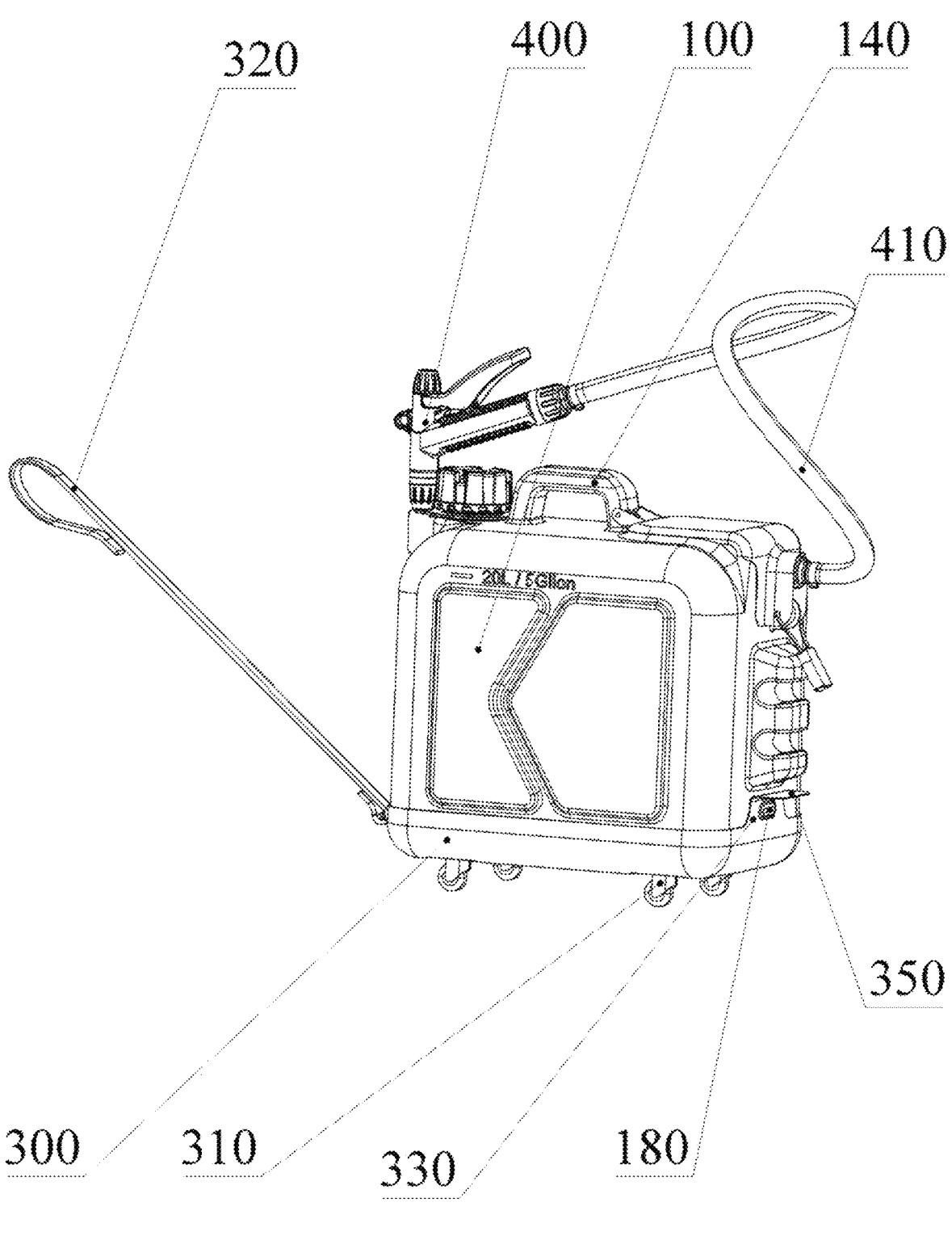
FIG. 1 is a perspective schematic diagram of an embodiment provided by the present disclosure.

Reference signs: Fuel Tank (100); Mounting Groove (110); Recessed Groove (111); Outlet Port (130); Handle (140); Protective Cover (150); Flat End (151); Extended End (152); Slide Groove (153); Rib (154); Connecting Ring (156); Combination Lock (157); Tank Filling Port (160); Tank Cap (161); Vent Valve (162); Inclined Tooth (163); Screw Rod (164); Spacer (170); Fitting Sleeve (171); Elastic Strip (172); Mounting Block (180); Controller (200); Base (210); Fixed Chamber (220); Elastic Element (230); Elastic Sheet (231); Boss (232); Extended Hole (240); Connecting Pipe (250); Threaded Connector (251); Inlet Pipe (252); First Sealing Ring (253); Second Sealing Ring (254); Stand (300); Movable Wheel (310); Pull Rod (320); Switch Piece (330); Mounting Hole (340); Pedal (350); Fuel Nozzle (400); Oil Delivery Pipe (410); Mounting Plate (500); Slot (510); Mesh Bag Structure (600).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

A fuel supply device includes a fuel tank 100, a controller 200, a stand 300 and a fuel nozzle 400 (refer to FIG. 1).

Figure 11:
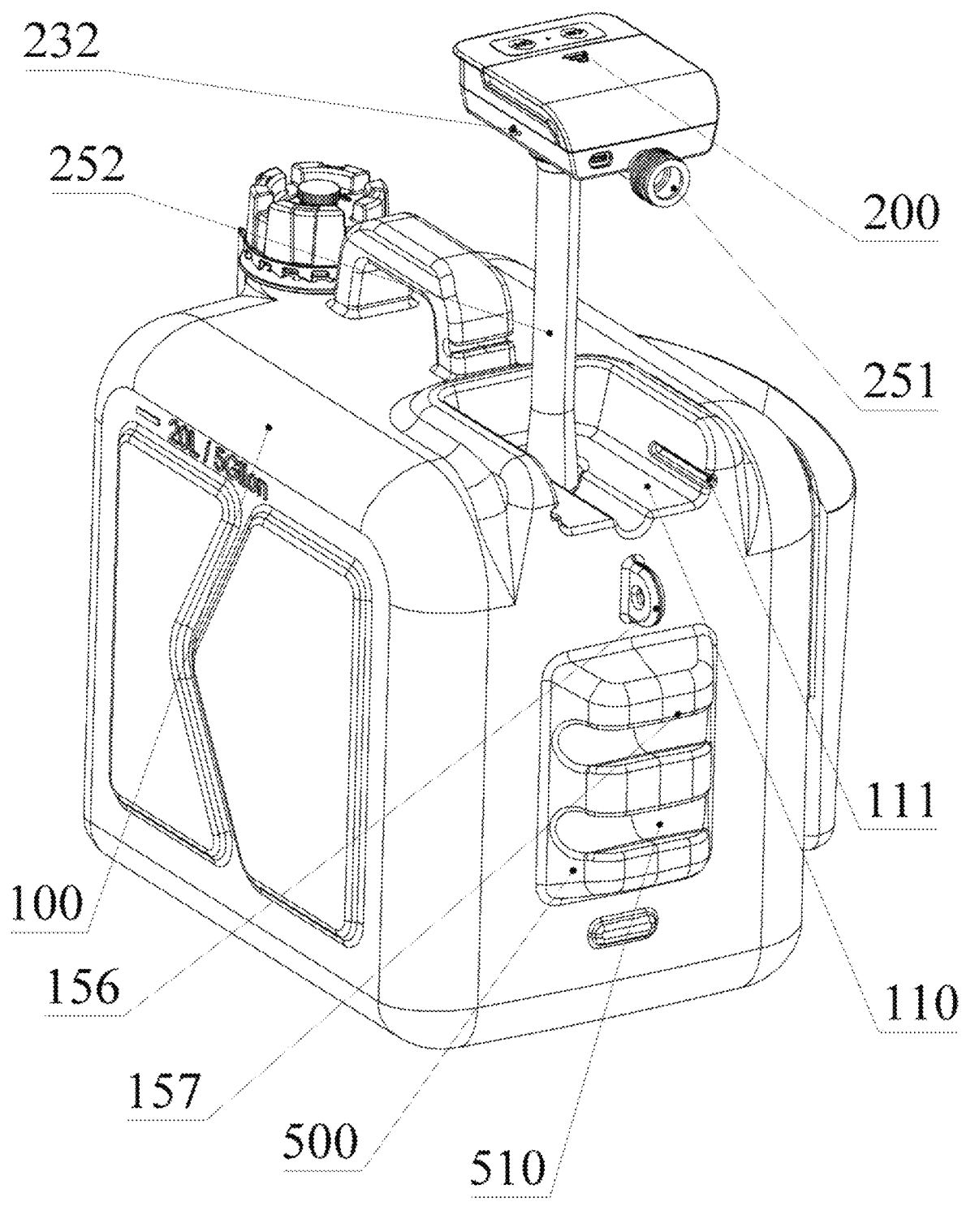
FIG. 11 is a separation schematic diagram of the fuel tank and the controller in the embodiment shown in FIG. 8.
Figure 12:
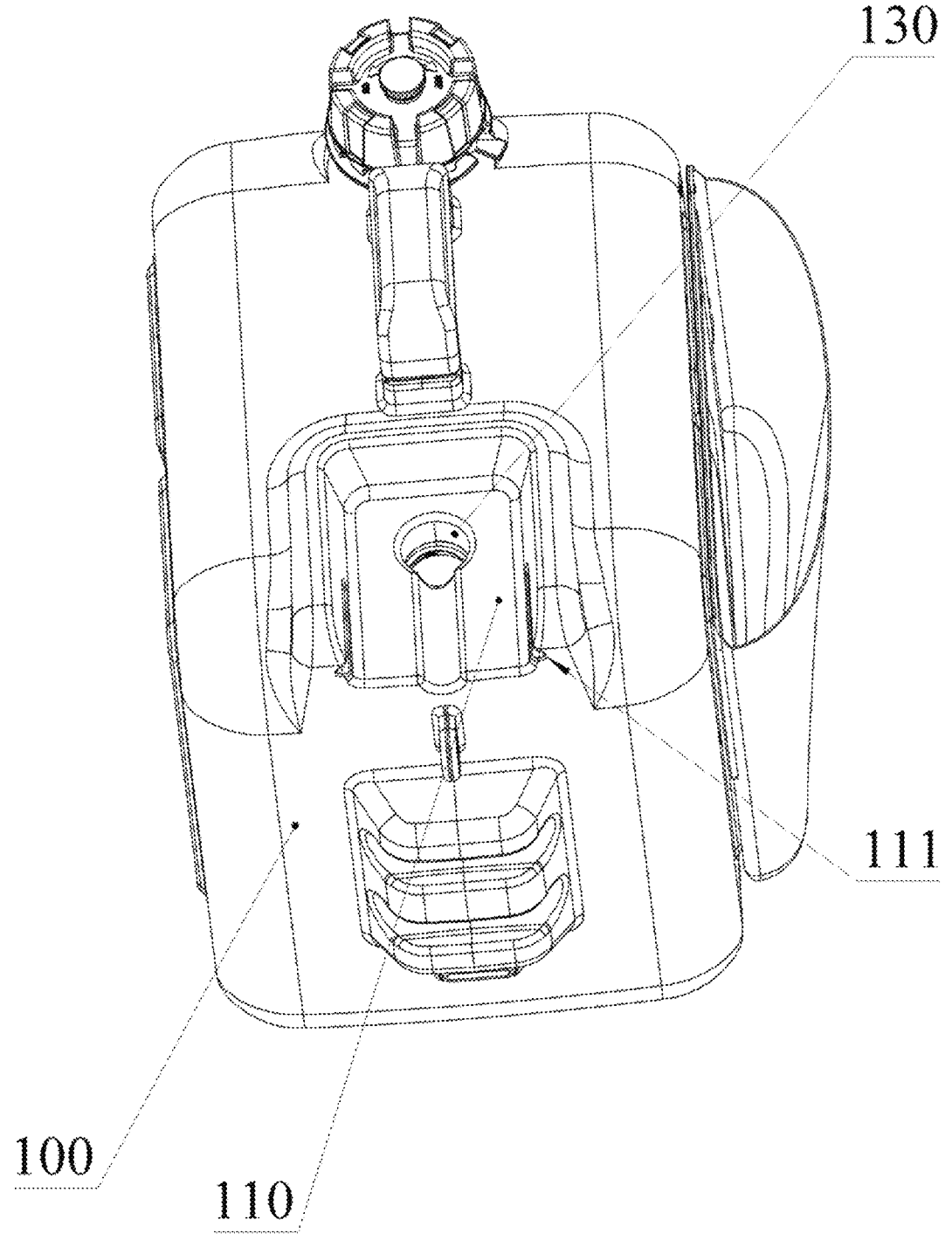
FIG. 12 is a structural schematic diagram of the mounting groove in the embodiment shown in FIG. 2.

In this embodiment, referring to FIGS. 11 and 12, the top of the fuel tank 100 is provided with a mounting groove 110, which is partially open to the outside and has dimensions matching the controller 200. The inner walls on both sides of the mounting groove 110 are provided with recessed grooves 111 that are open at one end to the outside, and the bottom wall of the mounting groove 110 is provided with an outlet port 130 that communicates with the interior of the fuel tank 100.

Figure 4:
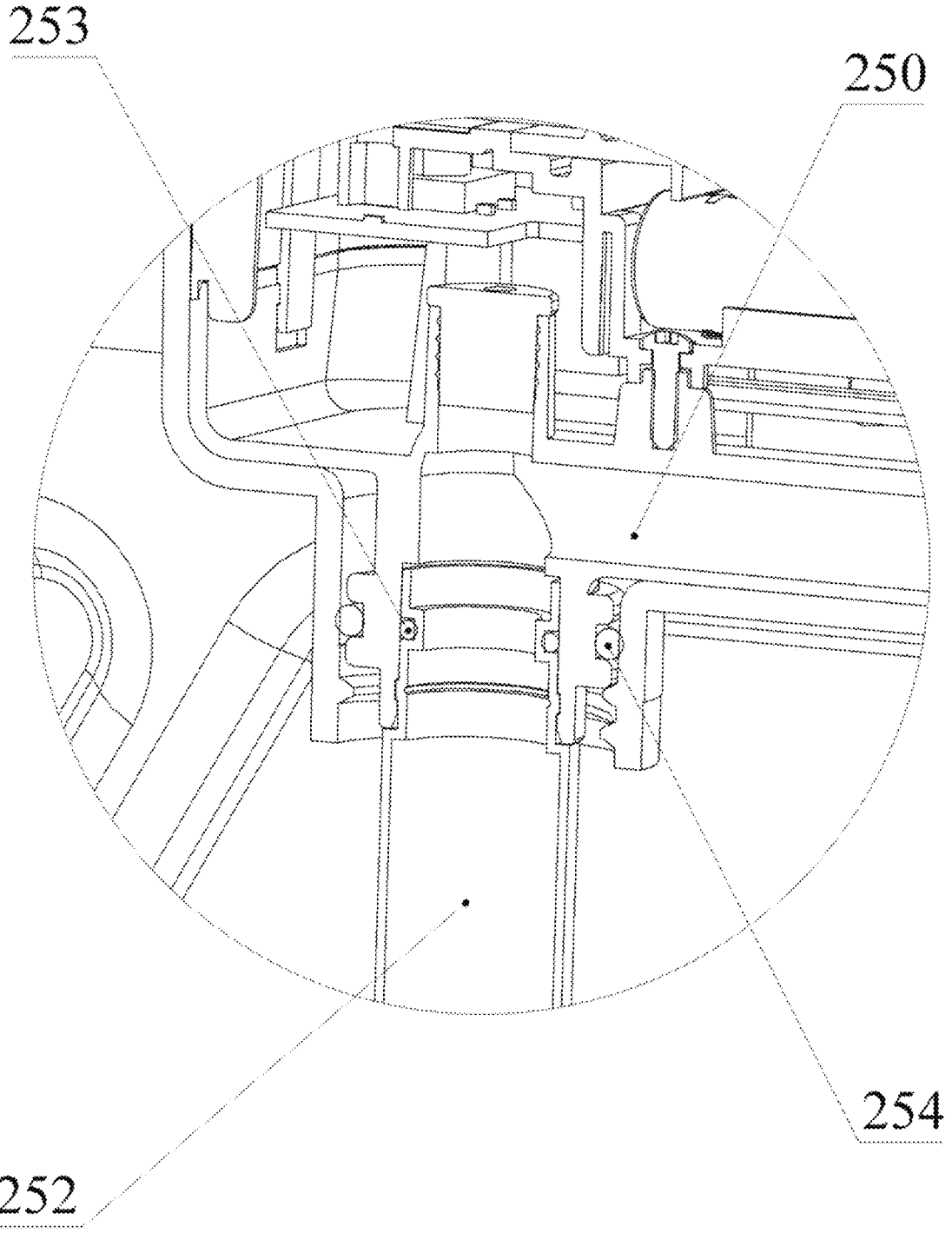
FIG. 4 is an enlarged view of section A in the embodiment shown in FIG. 3.
Figure 5:
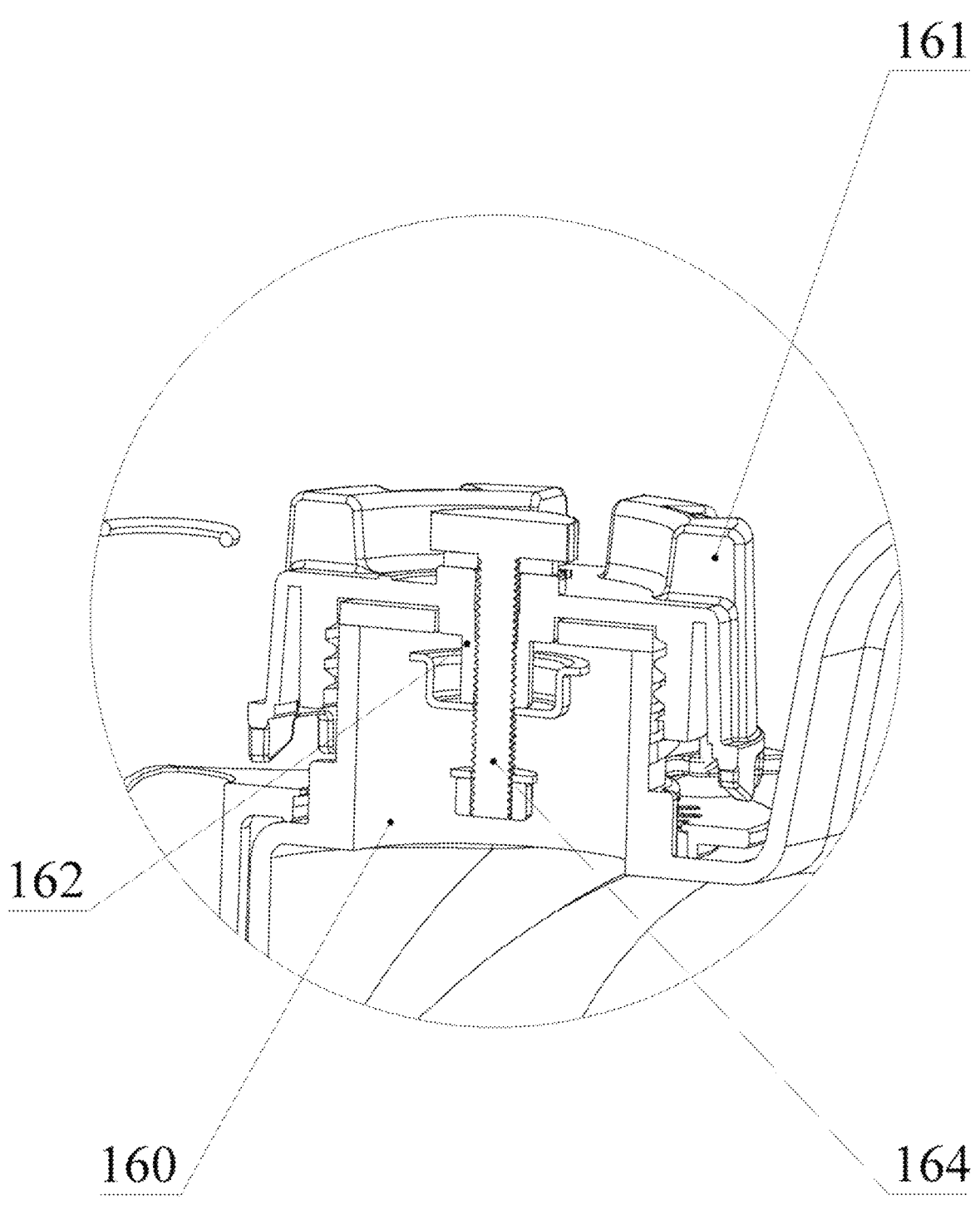
FIG. 5 is an enlarged view of section B in the embodiment shown in FIG. 3.
Figure 8:
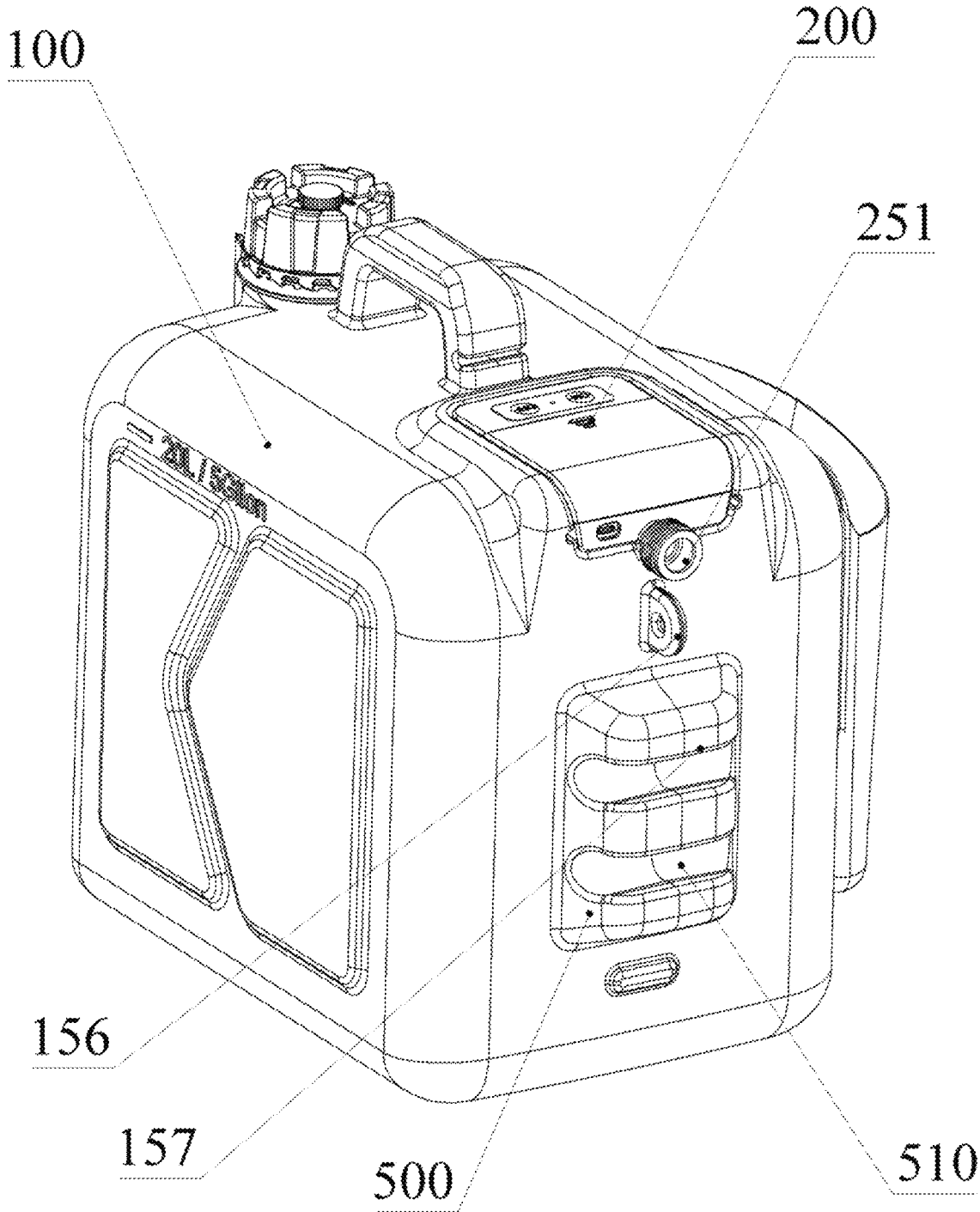
FIG. 8 is a schematic diagram of the connection between the fuel tank and the controller in the embodiment shown in FIG. 2.

In this embodiment, referring to FIGS. 4, 5, and 8, the controller 200 includes a base 210 and a control module. The bottom of the base 210 is fixedly equipped with a connecting pipe 250, one end of which is fixedly fitted with a threaded connector 251, while the other end is provided with an inlet pipe 252, which is arranged vertically relative to the base 210.

In other embodiments, referring to FIG. 4, the connecting pipe 250 adopts an L-shaped design, and one end of the inlet pipe 252 can be fixedly connected to the connecting pipe 250. The inner wall of the inlet pipe 252 is provided with a first recess, inside which a first sealing ring 253 is fixed, its surface tightly contacting the outer wall of the connecting pipe 250. The outer surface of the connecting pipe 250 is provided with a second recess, inside which a second sealing ring 254 is fixed, tightly contacting the inner wall of the outlet port 130.

The L-shaped design of the connecting pipe 250 allows flexible adaptation to the spatial layout inside or around the fuel tank, especially in confined installation environments (such as when pipelines need to turn or avoid other components), reducing space occupation and enhancing the compactness of the overall structure. At the same time, through the first sealing ring 253 and the second sealing ring 254, a dual-sealing structure is formed: the first sealing ring 253 seals the connection gap between the inlet pipe 252 and the connecting pipe 250, while the second sealing ring 254 seals the connection gap between the connecting pipe 250 and the outlet port 130. This effectively blocks potential oil leakage paths, significantly improves sealing reliability, and reduces oil waste or safety hazards caused by leaks.

In other embodiments (not shown), the connecting pipe 250 and the inlet pipe 252 adopt a "quick-insert and rotate-to-lock" connection: the end of the connecting pipe 250 is equipped with an annular protrusion, while the inner wall of the inlet pipe 252 features an L-shaped guide groove. The first sealing ring 253 is made of polyurethane with a triangular cross-section. During assembly, the connecting pipe 250 is inserted into the inlet pipe 252 and rotated 90 degrees, causing the annular protrusion to slide along the guide groove into the locking position, compressing the sealing ring to form a seal. Compared to threaded connections, this quick-release structure reduces installation and removal time, and the triangular sealing ring provides superior sealing under pressure, making it suitable for scenarios requiring frequent pipeline replacement.

Figure 9:
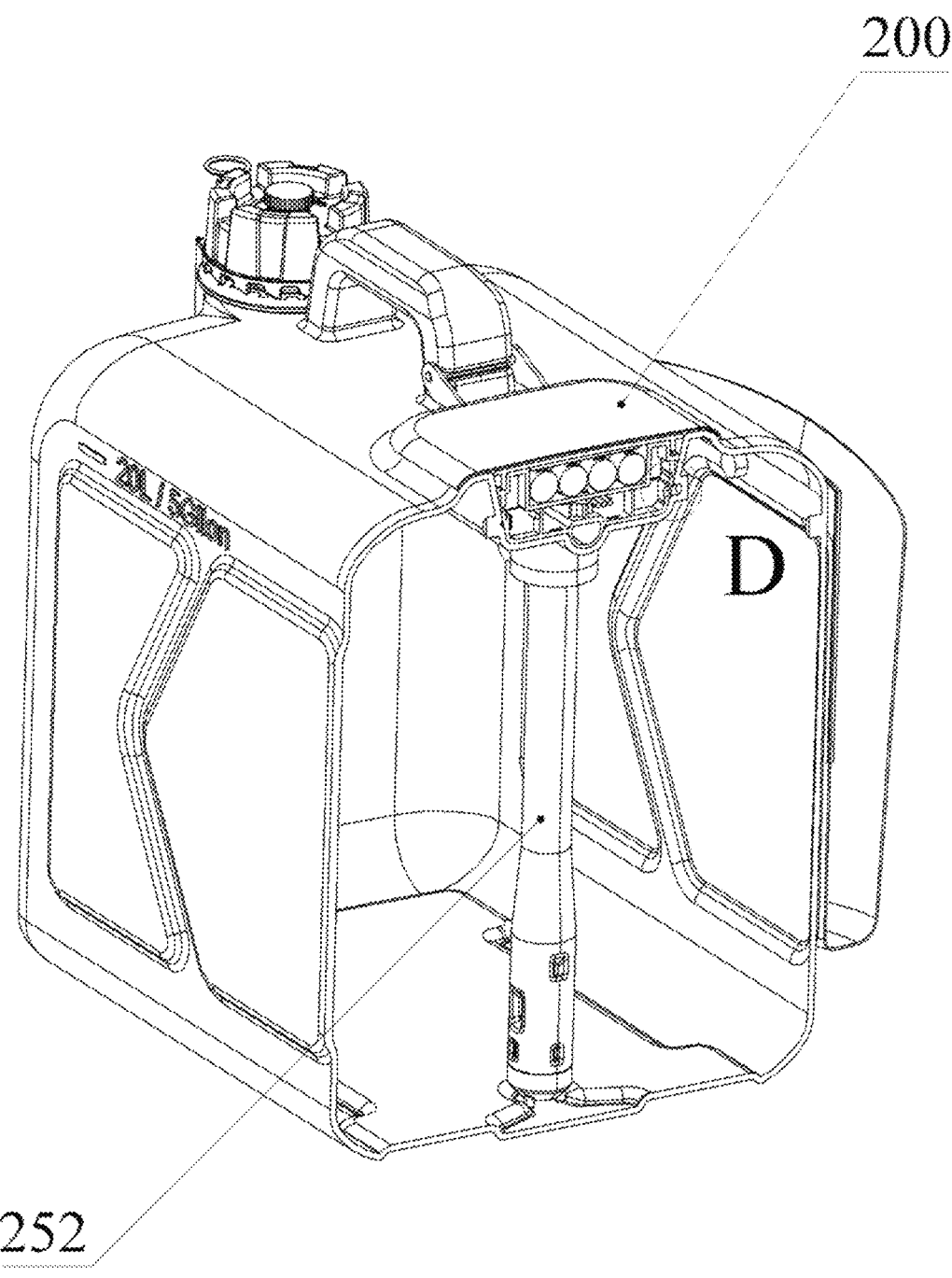
FIG. 9 is a perspective cross-sectional view of the interior of the fuel tank in the embodiment shown in FIG. 8.
Figure 10:
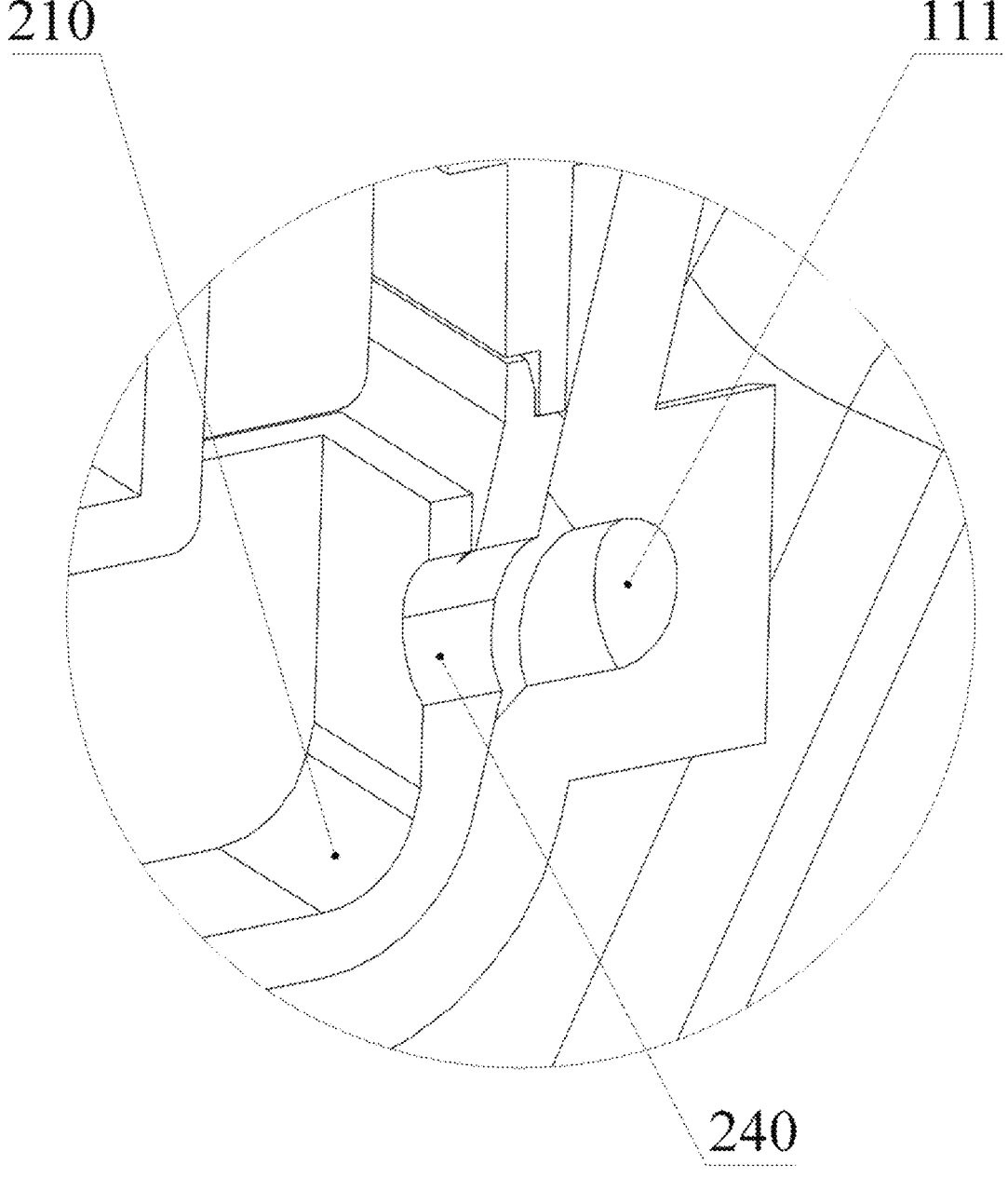
FIG. 10 is an enlarged view of section D in the embodiment shown in FIG. 9.
Figure 13:
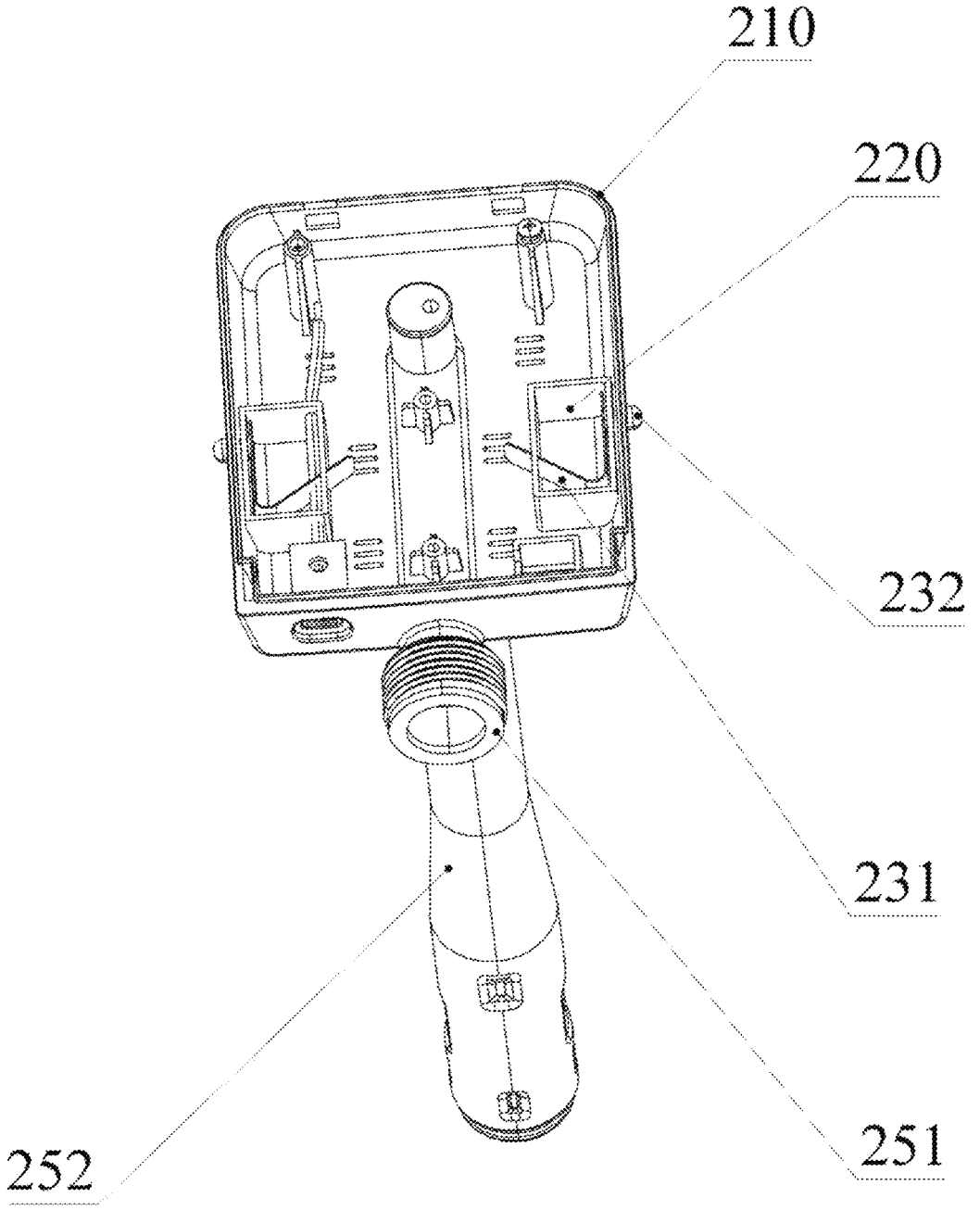
FIG. 13 is a structural schematic diagram of the interior of the controller in the embodiment shown in FIG. 11.

In other embodiments, please refer to FIGS. 9, 10, and 13. The inner bottom wall of the base 210 is fixed with two opposing fixed chambers 220, each containing an elastic element 230. The two side surfaces of the base 210 are provided with extended holes 240 that communicate with the interior of the fixed chambers 220, allowing part of the elastic element 230 to extend outside the base 210 through the extended holes 240.

In other embodiments, please refer to FIGS. 10 and 13. The elastic element 230 includes a V-shaped elastic sheet 231, which is movably engaged within the fixed chamber 220 and equipped with a boss 232. One end of the boss 232, away from the elastic sheet 231, movably passes through the extended hole 240. Its diameter matches the width of the recessed groove 111, and the length exposed outside the base 210 corresponds to the length of the recessed groove 111.

When installing the controller 200, the operator first inserts the inlet pipe 252 into the fuel tank 100 through the outlet port 130, then places the controller 200 into the mounting groove 110. At this point, the controller is pressed downward to allow the bosses 232 on both sides of the base 210 to contact and compress against the inner wall of the mounting groove 110 under pressure, forcing the elastic sheet 231 in the fixed chamber 220 to deform. The bosses 232 subsequently retract into the extended hole 240. When the bosses 232 move to the position of the recessed groove 111, the compressive force from the inner wall of the mounting groove disappears. The elastic sheet 231 returns to its original state, releasing elastic potential energy and pushing the bosses 232 to snap into the recessed groove 111, accompanied by a crisp sound, signaling that the controller 200 is properly installed.

The entire installation process requires no screws, making it simple and efficient. For removal, the operator only needs to insert a small tool like a screwdriver into the recessed groove 111 and push the bosses 232 toward the extended hole 240 to disengage them from the recessed groove, allowing easy removal of the controller 200, significantly improving disassembly convenience. Meanwhile, after the bosses 232 are snapped into the recessed groove 111, the elastic sheet 231 generates a continuous resilience force due to deformation, constantly applying an outward thrust on the bosses 232 to ensure tight contact with the inner wall of the recessed groove 111, forming a self-tightening fixation. In environments with vibration or impact, the deformation of the elastic sheet 231 can buffer external forces, preventing gaps between the bosses 232 and the recessed groove 111 caused by rigid collisions, ensuring stable connection. This addresses the issues of traditional threaded connections lacking active preload and being prone to loosening under external forces.

In other embodiments (not shown), the elastic element 230 in this embodiment replaces the elastic sheet 231 with a "spring-lock pin" combination. Specifically, the fixed chamber 220 of the base 210 contains a compression spring, with one end of the lock pin connected to the spring and the other end extending outside the base through the extended hole 240. The inner wall of the recessed groove 111 features an annular recess matching the lock pin. During installation, the lock pin is compressed by the inner wall of the mounting groove 110, retracting the spring. When reaching the recessed groove 111, the spring resets, pushing the lock pin to snap into the annular recess, creating circumferential restraint. For removal, a button at the end of the lock pin is pressed to compress the spring, releasing the pin from the recess. The linear deformation characteristics of the spring provide more uniform preload, while the annular recess and lock pin's circumferential restraint further enhance torsional resistance, making it suitable for scenarios requiring frequent disassembly and higher stability demands.

Figure 6:
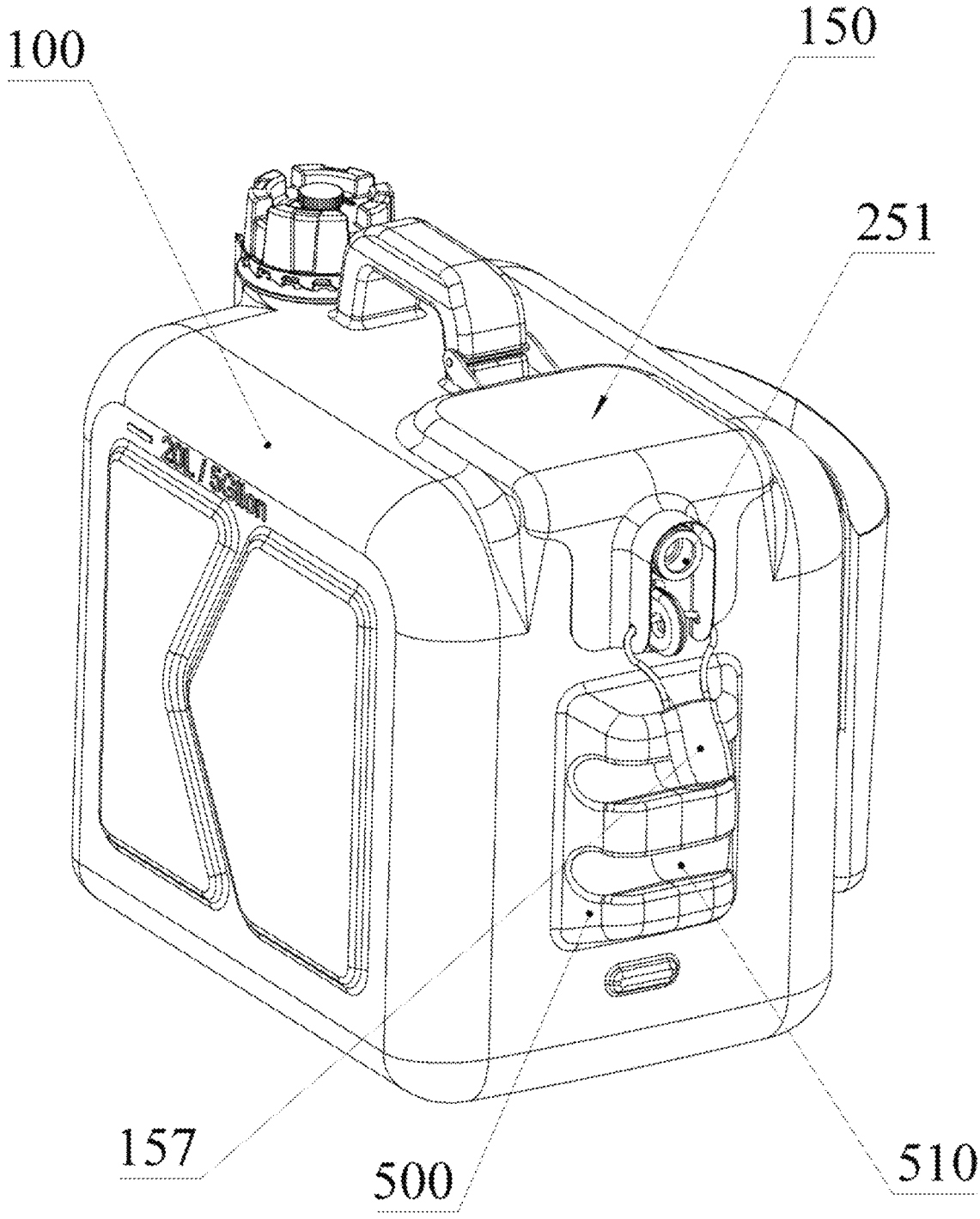
FIG. 6 is a schematic diagram of the connection between the fuel tank and the protective cover in the embodiment shown in FIG. 2.
Figure 14:
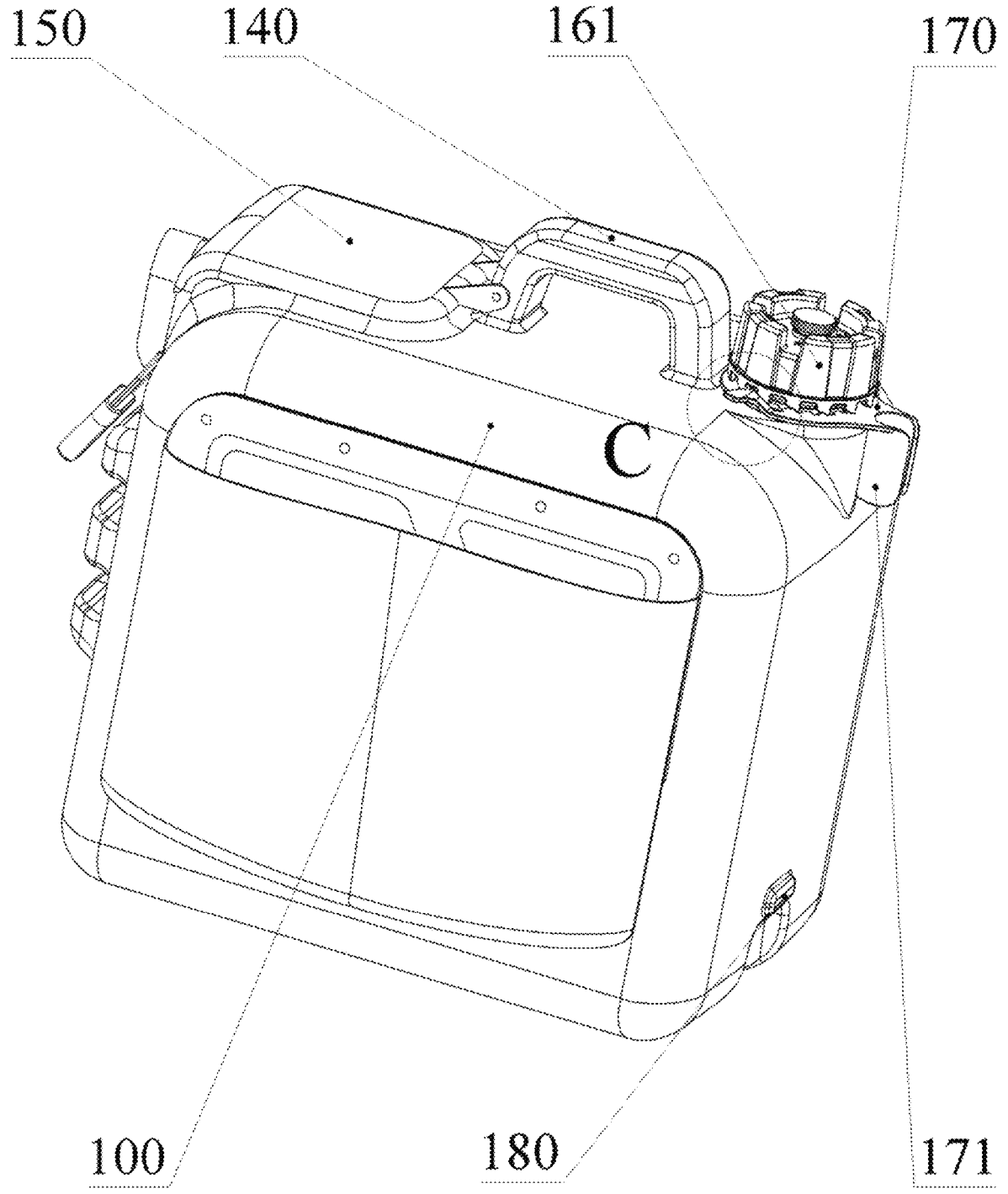
FIG. 14 is a schematic diagram of the connection between the fitting sleeve and the tank cap in the embodiment shown in FIG. 2.

In this embodiment, referring to FIGS. 6 and 14, a handle 140 is fixedly installed on top of the fuel tank 100, with a protective cover 150 hinged on the side facing towards the mounting groove 110. The protective cover 150 can rotate around the hinge point with the handle 140. When rotated to fit against the top of the fuel tank 100, it fully covers the top of the controller 200, thereby providing protection and waterproofing for the controller 200.

Figure 7:
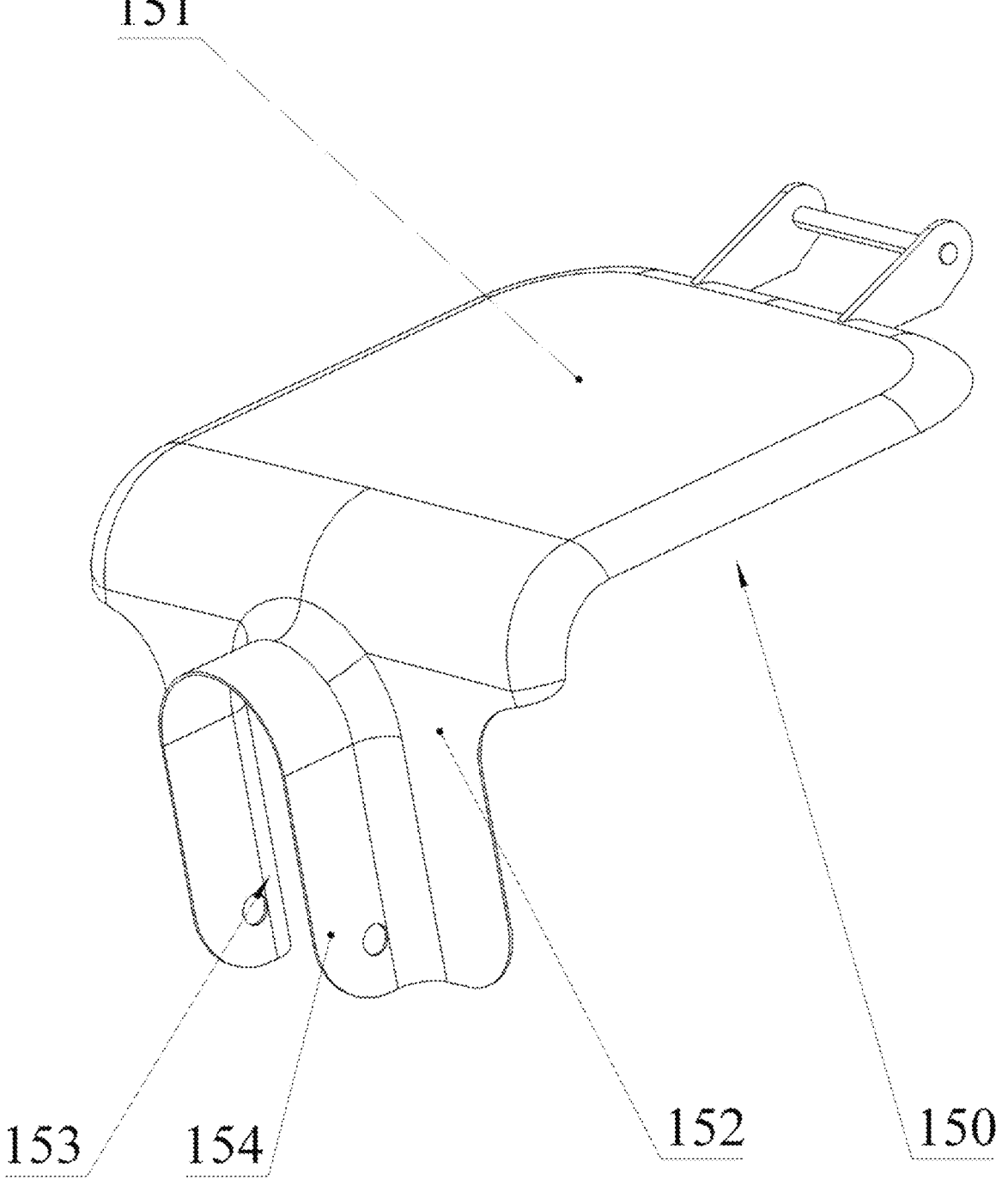
FIG. 7 is a schematic diagram of the protective cover in the embodiment shown in FIG. 6.

In other embodiments, referring to FIGS. 6 and 7, the protective cover 150 consists of a flat end 151 and an extended end 152, forming an L-shaped structure. A slide groove 153 is opened in the middle of the extended end 152, with the side of the slide groove 153 opposite the flat end 151 extending to the outside. When the flat end 151 fits against the top of the fuel tank 100, the threaded connector

251 precisely extends into the slide groove 153. The L-shaped split design of the protective cover 150 allows it to cover the top of the controller 200 with the flat end 151 while wrapping around the threaded connector 251 with the extended end 152, creating a three-dimensional "top+side" protection. Additionally, the open design of the slide groove 153 allows the threaded connector 251 to naturally extend in, avoiding compression or obstruction to the threaded connector 251 when the protective cover 150 is closed.

In other embodiments, referring to FIGS. 6 and 7, the edge of the slide groove 153 extends outward to form a rib 154, which is of the same length as the threaded connector 251. Mounting holes are symmetrically arranged on both sides of the rib 154, below the threaded connector 251. A connecting ring 156 is fixed at a position on the surface of the fuel tank 100 corresponding to the inner side of the ribs 154. When the flat end 151 fits against the top of the fuel tank 100, the centers of the mounting holes align with the center of the connecting ring 156, and a combination lock 157 is movably inserted between them. The rib 154, being equal in length to the threaded connector 251, further wraps around the connection area from both sides, forming a semi-enclosed space with the slide groove 153 to reduce the path for dust or liquid intrusion from the sides, enhancing three-dimensional protection for the threaded connector. The cooperation of the mounting holes, connecting ring, and combination lock enables the mechanical locking function of the protective cover, effectively preventing unauthorized personnel from opening the cover, touching, or disassembling the controller and its connecting components, thereby reducing the risk of equipment damage or fuel leakage due to human operation.

In other embodiments (not shown), the inner side of the rib 154 of the protective cover 150 is equipped with a permanent magnet, and the connecting ring 156 at the corresponding position of the fuel tank 100 is made of ferromagnetic material; a silicone sealing ring is provided at the contact point between the flat end 151 and the top of the fuel tank 100. When the protective cover 150 is closed, the permanent magnet and the connecting ring 156 are fixed by magnetic force, and the silicone ring is compressed to form a seal; opening only requires applying a pulling force greater than the magnetic attraction. This design enables quick locking without additional locks, reduces mechanical wear through magnetic attraction, and enhances waterproof and dustproof performance with the silicone ring, making it suitable for household scenarios requiring high operational convenience.

Figure 2:
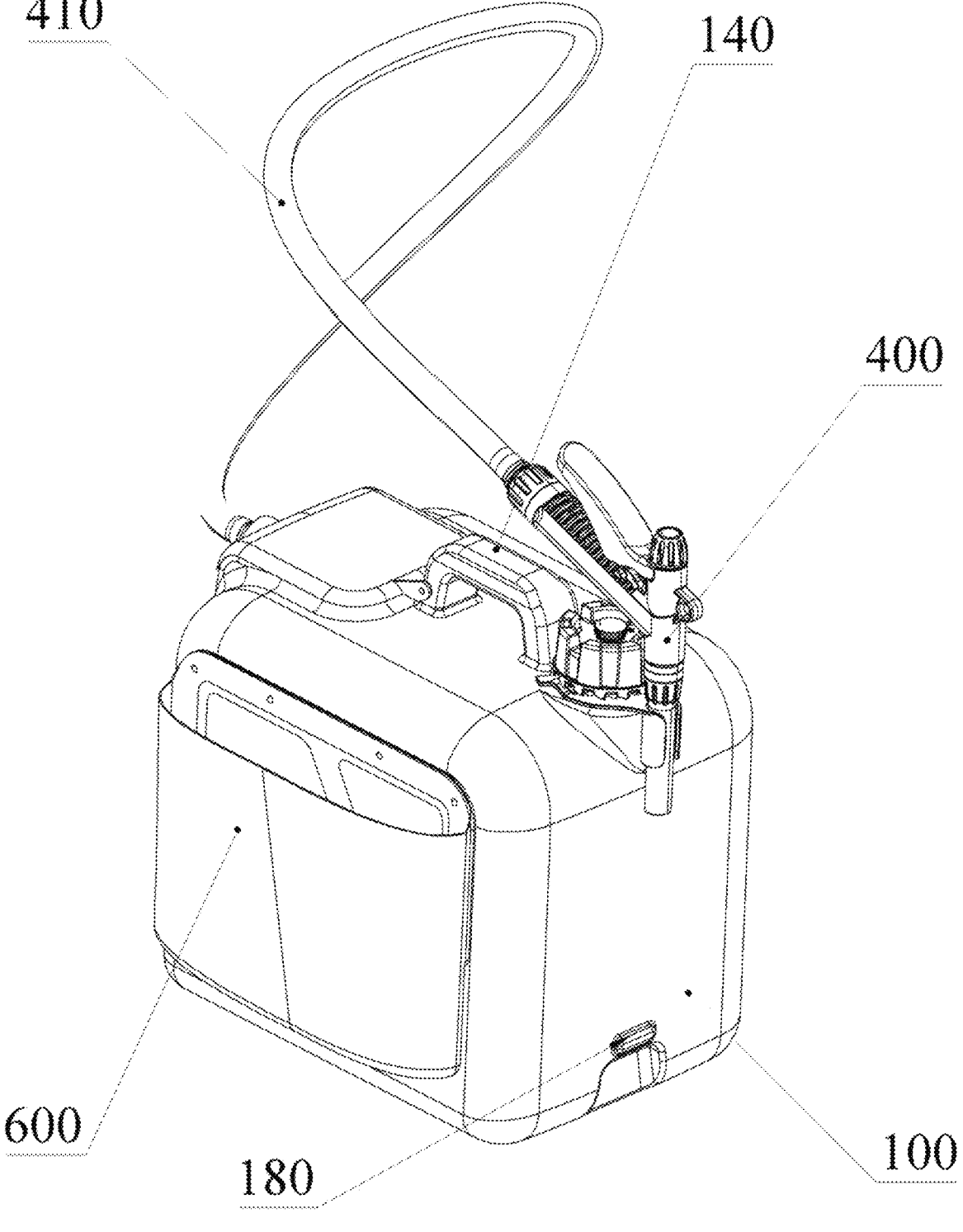
FIG. 2 is a structural schematic diagram of the fuel tank in the embodiment shown in FIG. 1.

In this embodiment, referring to FIGS. 1 and 2, the fuel nozzle 400 is equipped with an oil delivery pipe 410, and the end of the oil delivery pipe 410 away from the fuel nozzle 400 is connected to the threaded connector 251 through threaded connection. The oil delivery pipe 410 and the threaded connector 251 can be connected or detached by rotation, eliminating the need for specialized tools and facilitating quick replacement of the oil delivery pipe 410 or maintenance of the connection for operators.

In other embodiments, the side of the fuel tank 100 is fixed with a mounting plate 500, which is provided with multiple slots 510. When the oil delivery pipe 410 is too long, it can be inserted into the slot 510 to achieve positional fixation. Organizing and securing excessively long oil delivery pipes 410 through the slots 510 prevents haphazard dragging, sagging, or tangling, reduces space occupation around the fuel tank, and improves the overall neatness of the equipment layout. Additionally, securing the oil delivery pipe 410 avoids collision and wear caused by shaking or friction with other components, minimizes the risk of oil leakage due to outer skin damage, and prevents tripping hazards from excessively long pipes, enhancing operational safety.

In other embodiments (not shown), the inner wall of the slot 510 is fixed with a rubber pad. The rubber pad possesses elastic deformation properties, allowing adjustment of the effective space inside the slot 510 through compression, enabling the same slot 510 to stably accommodate oil delivery pipes 410 of different diameters (e.g., due to model changes or specification differences). This eliminates the need to design separate slots 510 for different pipes, reducing component variety and lowering manufacturing costs. Moreover, the soft texture of the rubber pad prevents direct contact and friction between the oil delivery pipe 410 and the inner wall of the slot 510 (typically made of hard materials), minimizing scratches and wear on the pipe's outer skin caused by long-term insertion. This prevents oil leakage or accelerated aging due to skin damage, extending the service life of the oil delivery pipe.

In other embodiments (not shown), the slot 510 on the mounting plate 500 is replaced with a "rotatable buckle assembly": the buckle consists of a fixed base and a rotatable curved clamping plate, with anti-slip grooves on the inner side of the clamping plate. The spacing between the clamping plates is adjusted through a knob. The oil delivery pipe 410 can be clamped and secured by rotating the knob, accommodating a wider range of diameters. Compared to the slot, this allows active adjustment of clamping force, preventing the pipe from slipping due to looseness or damage to the outer layer from excessive tightness, making it suitable for temporarily securing oil delivery pipes of various specifications.

Figure 3:
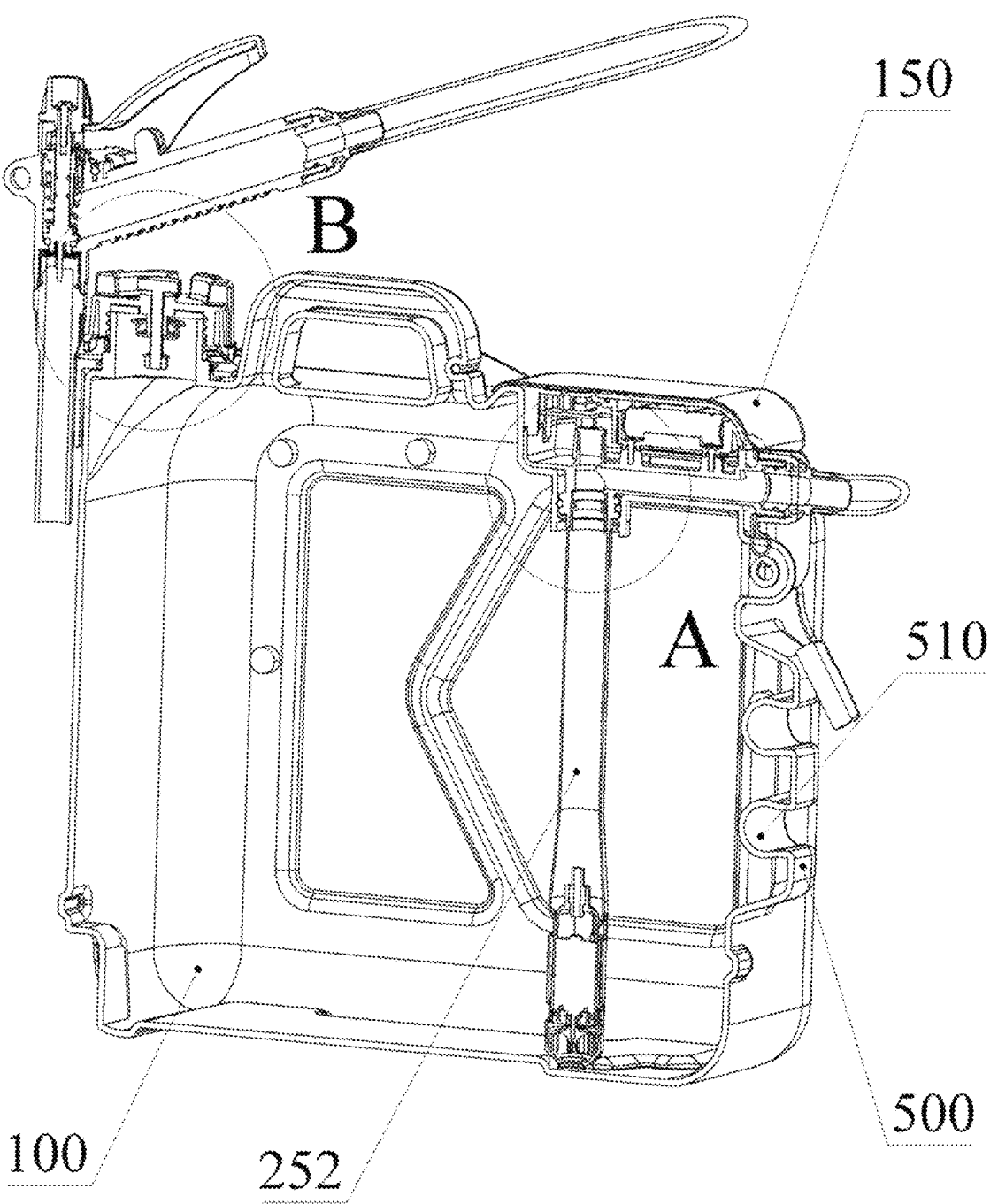
FIG. 3 is a perspective cross-sectional view of the interior of the fuel tank in the embodiment shown in FIG. 2.

In this embodiment, referring to FIGS. 3 and 5, the top of the fuel tank 100 is fixedly equipped with a tank filling port 160, serving as the main channel for fluid input. The tank cap 161 is screwed onto the outer wall of the tank filling port 160, providing preliminary closure for the inlet pipe port. A through opening is centrally located on the tank cap 161, with a vent valve 162 integrally formed on its inner wall, featuring a vent hole. A screw rod 164 is threaded into the inner wall of the vent hole, forming an axially adjustable sealing structure. When workers need to extract fluid from the fuel tank 100, they simply rotate the screw rod 164 upward to release the seal on the vent hole. During extraction, the reduction of fluid inside the fuel tank 100 creates negative pressure, allowing air to enter through the vent hole and balance the internal and external pressure of the fuel tank 100, ensuring a continuous and stable extraction process.

In other embodiments (not shown), a filter screen is fixedly installed on the inner wall of the tank filling port 160. During storage or transportation, the fluid may become contaminated with impurities such as dust, metal shavings, or fibers. The filter screen directly intercepts these particles, preventing them from entering the fuel tank 100. Additionally, when air enters the fuel tank through the vent valve 162, the filter screen blocks dust in the air, preventing contamination of the fluid.

In other embodiments (not shown), the filter screen in the tank filling port 160 adopts a drawer-style design. The inner wall of the tank filling port 160 is equipped with slide rails, and the edges of the filter screen are fitted with sliders that slide along the rails. A pull handle is attached to the outer side of the filter screen for easy removal. When cleaning is required, the filter screen can be pulled out and rinsed directly without disassembling the tank filling port 160. This solves the issue of accumulated impurities being difficult to clean in fixed filter screens after prolonged use, improving maintenance convenience, especially in scenarios requiring frequent fluid refills.

Figure 15:
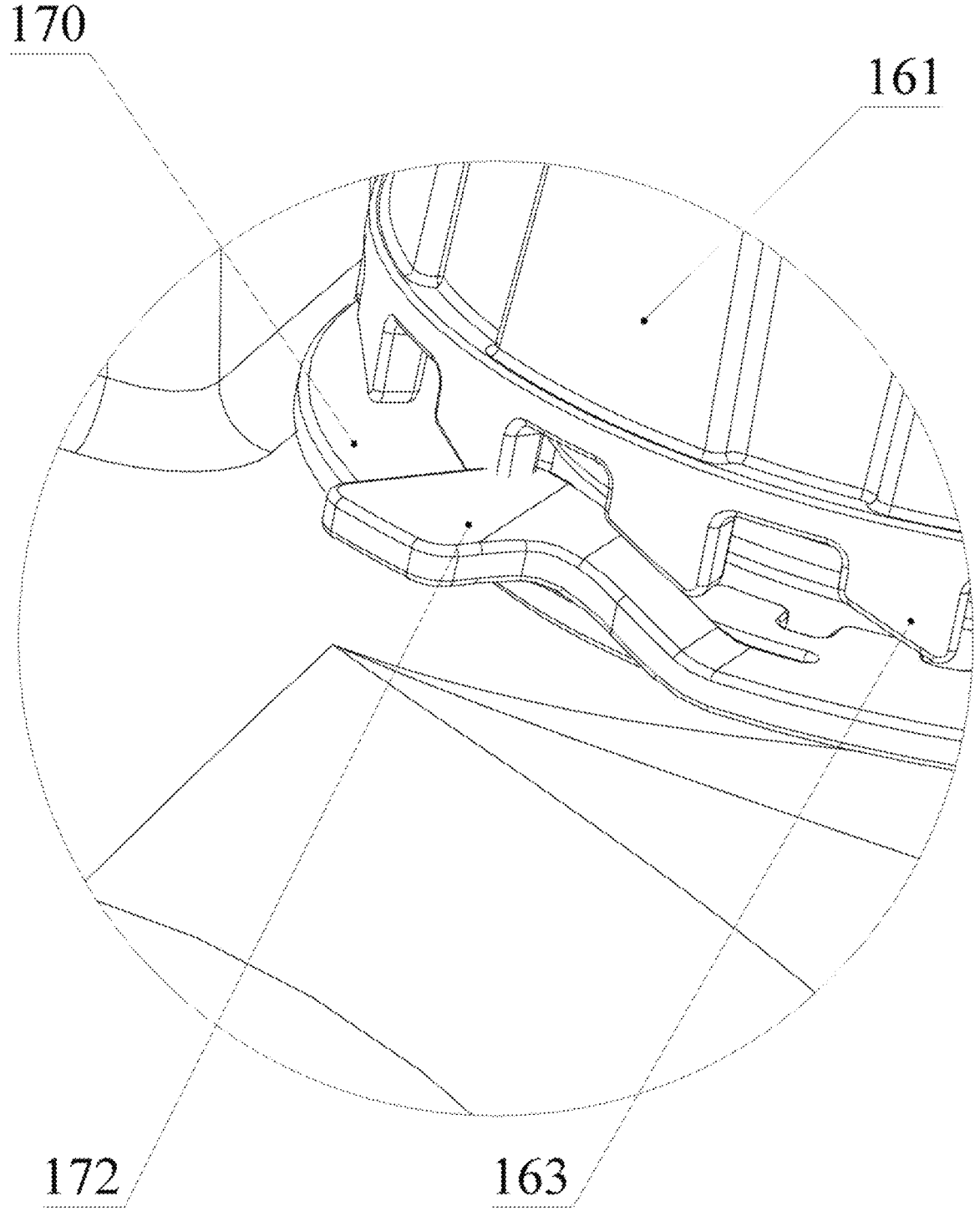
FIG. 15 is an enlarged view of section C in the embodiment shown in FIG. 14.

In other embodiments, referring to FIGS. 14 and 15, a spacer 170 is sleeved over the tank filling port 160. A fitting sleeve 171 is integrally formed on the spacer 170, and the fuel nozzle 400 can be movably snapped into the fitting sleeve 171 to secure the nozzle. The fitting sleeve 171 provides a dedicated fixing position for the fuel nozzle 400, preventing it from being placed haphazardly after refueling, which could lead to damage from impact, oil spills from residual fuel dripping, or hazards like slippery surfaces and personnel falls. This ensures a cleaner and more orderly work environment, enhancing operational safety.

In other embodiments, referring to FIG. 15, a portion of the spacer 170 protrudes upward to form an elastic strip 172, and the bottom surface of the tank cap 161 is fixed with multiple inclined teeth 163. When the tank cap 161 is screwed onto the tank filling port 160, the inclined teeth 163 on the bottom surface slide over the inclined surface of the elastic strip 172. However, when the operator needs to remove the tank cap 161, the elastic strip 172 creates a reverse lock against the inclined teeth 163. At this point, pressing the elastic strip 172 is required to release the lock, allowing the inclined teeth 163 to pass smoothly through the elastic strip 172 and complete the removal of the tank cap 161. The interaction between the elastic strip 172 and the inclined teeth 163 forms a "one-way locking" structure. To disassemble, the elastic strip 172 must be actively pressed to release the lock, preventing unauthorized personnel (such as accidental operators or children) from unscrewing the tank cap 161 arbitrarily. This avoids accidental fuel leakage or contamination inside the fuel tank 100, adding an extra "protective lock" to the tank's sealing integrity.

Figure 16:
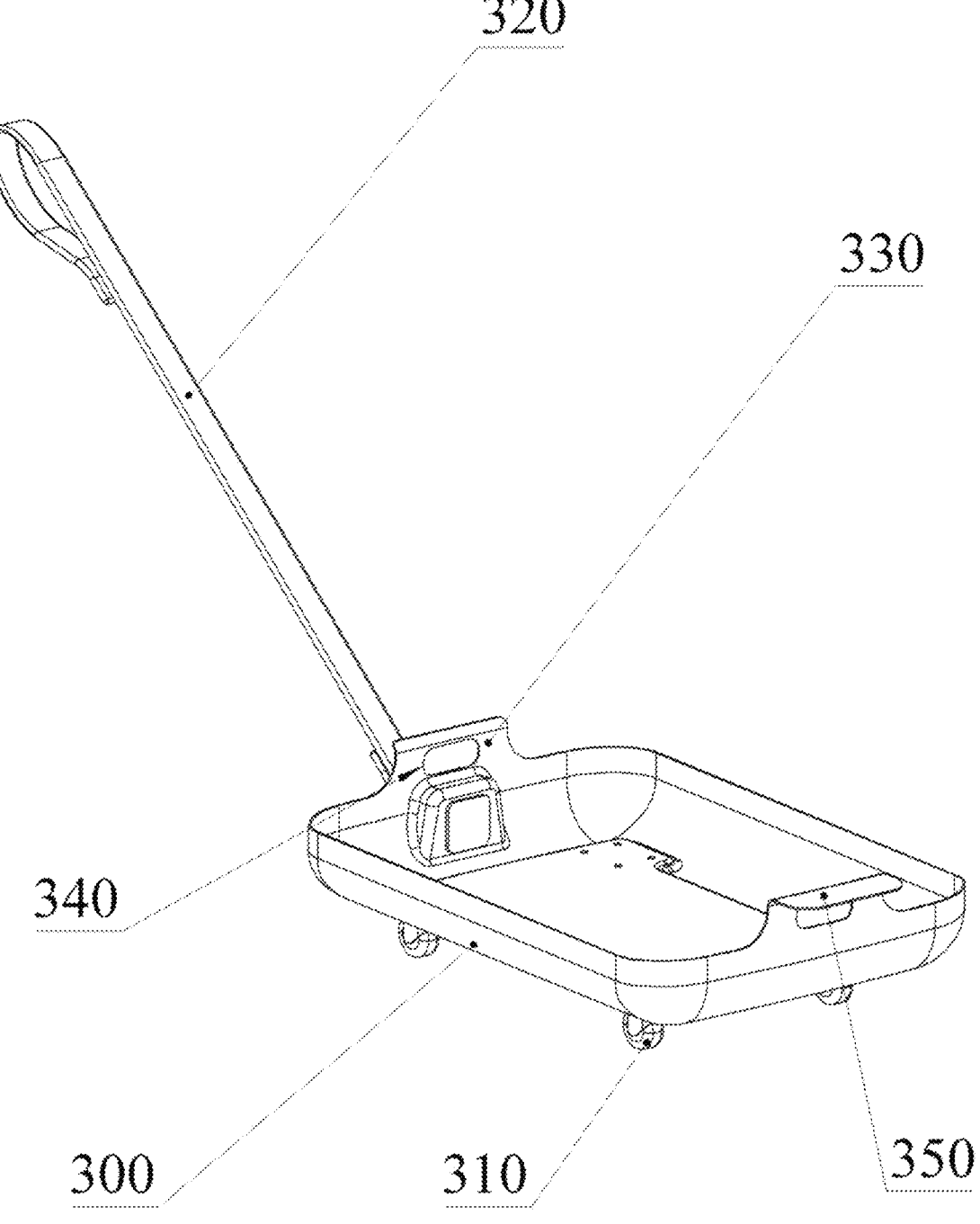
FIG. 16 is a structural schematic of the stand in the embodiment shown in FIG. 1.

In this embodiment, please refer to FIGS. 1 and 16. The bottom surface of the stand 300 is equipped with movable wheels 310 on all sides, and a pull rod 320 is installed on one side. Both ends of the stand 300 and the pull rod 320 on the same plane are fitted with switch pieces 330, which are elastic. Each switch piece 330 has a mounting hole 340, while mounting blocks 180 are fixed at corresponding positions on both ends of the fuel tank 100, matching the location and size of the mounting holes on the switch pieces 330. When the fuel tank 100 is placed on the stand 300, the mounting blocks 180 are snapped into the mounting holes 340 of the switch pieces 330, achieving quick fixation of the fuel tank 100. To separate them, the operator only needs to toggle the switch pieces 330 to release the mounting blocks 180 from the mounting holes 340. The stand 300, equipped with movable wheels 310 and a pull rod 320, forms a "handcart"-like structure, allowing easy pushing or pulling for mobility. This solves the inconvenience of transporting the fuel tank 100, particularly in scenarios requiring frequent relocation (e.g., outdoor operations or warehouse transfers), significantly reducing manual handling costs. Additionally, fixation is achieved by "snapping the mounting blocks 180 into the mounting holes 340," requiring only the placement of the fuel tank 100 into position for installation. For separation, simply toggling the switch pieces 330 suffices-no screws, clips, or additional tools are needed. The process is straightforward, can be performed quickly by a single person, greatly improving assembly/disassembly efficiency and saving operational time.

In other embodiments, please refer to FIG. 16. One of the switch pieces 330 is equipped with a pedal 350, eliminating the need for manual toggling. By stepping on the pedal 350, the operator can deform the switch piece 330 to separate the mounting block 180 from the mounting hole 340. When transporting the fuel tank 100 or operating other tools simultaneously, the operator's hands may be occupied. Stepping on the pedal 350 avoids the cumbersome process of "setting down tools, manually toggling the switch piece 330, and picking up tools again," enabling separation directly through foot action. This is especially suitable for scenarios requiring continuous workflow (e.g., outdoor refueling or equipment maintenance), minimizing operational interruptions. Moreover, if the switch piece 330 has high elasticity due to prolonged use or design requirements, manual toggling may demand sustained force, potentially causing hand fatigue. Since foot muscles are stronger, stepping on the pedal 350 leverages the principle of leverage to effortlessly deform the switch piece 330. This is particularly advantageous for scenarios involving frequent assembly/disassembly of the fuel tank 100, reducing physical strain on the operator.

In other embodiments (not shown), the movable wheel 310 of the stand 300 is equipped with a foot-operated braking device: a brake pad is installed on the rim of the movable wheel 310, and the pedal is connected to the brake pad through a linkage rod. When the pedal is pressed, the brake pad contacts the rim to achieve braking, and it resets when released. Meanwhile, the pull rod 320 features a telescopic design, allowing its extension length to be adjusted within the range of 50-100 cm. This enhances the stability of the stand 300 when stationary, preventing sliding due to external force contact. The telescopic pull rod also accommodates operators of different heights, improving handling comfort.

In this embodiment, as shown in FIG. 2, the fuel tank 100 is equipped with a mesh bag structure 600 for storing the detached fuel nozzle 400 and oil delivery pipe 410. If the fuel nozzle 400 and oil delivery pipe 410 are placed haphazardly after detachment, issues such as tangled pipes, the nozzle tip hitting the ground or getting soiled with oil may arise, and even safety accidents due to tripping could occur. The mesh bag structure 600 provides a dedicated storage space, allowing both items to be neatly organized, maintaining a tidy work area and reducing accidental risks caused by scattered objects.

In other embodiments (not shown), the mesh bag structure 600 and the fuel tank 100 can be detachably installed through bolts. Alternatively, other installation methods such as snap-fastening or magnetic adsorption may also be employed.

In other embodiments (not shown), the mesh bag structure 600 includes an internal vertical partition, dividing it into a fuel nozzle 400 placement area and a pipe storage area. The bottom of the mesh bag structure 600 is connected to the fuel tank 100 through sliding rails, allowing horizontal pulling along the side of the tank. The pipe storage area features a built-in winding post, enabling the oil delivery pipe 410 to be coiled around it to prevent tangling. The layered design facilitates separate storage of the fuel nozzle 400 and pipes, while the sliding rail structure eases access. The winding post further optimizes pipe organization efficiency and reduces storage space usage.

In summary, as can be seen from the above description, the present disclosure achieves the following technical effects: the snap-fit structure of the elastic sheet 231, the boss 232 and the recessed groove 111 is used to replace traditional screw or threaded fixation methods, enabling rapid installation and removal of the controller 200 without tools. This solves the high-cost issue of existing fixation methods while avoiding the operational complexity caused by frequent screwdriver use, significantly improving assembly efficiency and long-term structural stability. After the boss 232 is snapped into the recessed groove 111, the elastic sheet 231 generates a continuous resilience force due to deformation, consistently applying an outward thrust to the boss 232, ensuring tight contact between the boss 232 and the inner wall of the recessed groove 111, forming a self-tightening fixation. In vibration or impact environments, the deformation of the elastic sheet 231 buffers external forces, preventing gaps between the boss 232 and the recessed groove 111 due to rigid collisions, ensuring stable connection. This addresses the issues of traditional threaded connections lacking active preload and being prone to loosening under external forces.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A fuel supply device, comprising:
a fuel tank provided with at least one recessed groove; and
a controller comprising a base, an elastic element and a boss driven by the elastic element;

wherein the controller is detachably fixed to the fuel tank by snapping the boss into the recessed groove, and the elastic element generates a continuous resilience force after the boss is snapped into the recessed groove, ensuring tight contact between the boss and the recessed groove to achieve self-tightening fixation.

2. The fuel supply device according to claim 1, wherein an inner bottom wall of the base is fixed with two oppositely arranged fixed chambers, and the elastic element is arranged within the fixed chamber; and extended holes communicating with the fixed chambers are arranged on both sides of the base, and the boss is inserted into the extended hole and connected to the elastic element.

3. The fuel supply device according to claim 2, wherein the elastic element comprises a V-shaped elastic sheet, and the elastic sheet is movably engaged within the fixed chamber.

4. The fuel supply device according to claim 1, wherein a connecting pipe is fixed at a bottom of the base, one end of the connecting pipe is provided with a threaded connector, and the other end is provided with an outlet pipe that is adapted to an outlet port and is capable of being inserted into the fuel tank.

5. The fuel supply device according to claim 4, wherein the connecting pipe has an L-shaped structure, and one end of the outlet pipe is fixedly connected to the connecting pipe;

a first recess is formed on an inner wall of the outlet pipe, and a first sealing ring is fixed inside the first recess and in a tight contact with an outer wall of the connecting pipe; and a second recess is formed on an outer surface of the connecting pipe, and a second sealing ring is fixed inside the second recess and is in tight contact with an inner wall of the outlet port.

6. The fuel supply device according to claim 4, wherein a handle is fixed on a top of the fuel tank, and a protective cover is hinged on a side of the handle; and the protective cover is rotatable to fit the top of the fuel tank and completely cover a top of the controller.

7. The fuel supply device according to claim 6, wherein the protective cover comprises a flat end and an extended end arranged in an L-shape;

a slide groove is formed in a middle portion of the extended end, with one side of the slide groove facing away from the flat end open to the outside; and when the flat end is fitted to the top of the fuel tank, the threaded connector extends into the slide groove.

8. The fuel supply device according to claim 7, wherein an edge of the slide groove extends outward to form a rib, with a length of the rib flush with the threaded connector, and mounting holes are symmetrically arranged on both sides of the rib below the threaded connector;

a connecting ring is fixed at a position on a surface of the fuel tank corresponding to an inner side of the rib, and when the flat end is fitted to the top of the fuel tank, the mounting holes lie on a same plane as the center of the connecting ring, with a combination lock movably inserted between the mounting holes and the connecting ring.

9. The fuel supply device according to claim 4, further comprising a fuel nozzle, wherein the fuel nozzle is equipped with an oil delivery pipe and connected to the threaded connector through the oil delivery pipe.

10. The fuel supply device according to claim 9, wherein an inlet pipe is fixed on the top of the fuel tank, and a tank cap is threadedly installed on an outer wall of the inlet pipe; and a through opening is formed at the center of the tank cap, a vent valve is integrally molded on an inner wall of the opening, and a screw rod is threadedly installed on an inner wall of the vent valve.

11. The fuel supply device according to claim 10, wherein a spacer is sleeved on the inlet pipe, a fitting sleeve is fixed on the spacer, and the fuel nozzle is movably engaged within the fitting sleeve.

12. A fuel supply device, comprising:

a fuel tank provided with at least one recessed groove; and a controller comprising a base;

wherein at least one fixed chamber is provided on an inner bottom wall of the base, and an elastic sheet is arranged inside the fixed chamber; and extended holes are arranged on both sides of the base, and the elastic sheet is fixedly provided with a boss that movably passes through the extended holes and is partially exposed to the outside;

wherein the controller is pressed to radially retract the boss until the boss is snapped into the recessed groove, thereby completing installation, while the elastic sheet releases a resilience force after the boss is snapped into the recessed groove, driving the boss to continuously press against a side wall of the recessed groove, forming a self-locking fixation.

13. The fuel supply device according to claim 12, wherein a connecting pipe is fixed at a bottom of the base, one end of the connecting pipe is provided with a threaded connector, and the other end is provided with an outlet pipe that is adapted to an outlet port and is capable of being inserted into the fuel tank.

14. The fuel supply device according to claim 13, wherein the connecting pipe has an L-shaped structure, with one end of the inlet pipe fixedly connected to the connecting pipe;

a first recess is formed on an inner wall of the inlet pipe, and a first sealing ring is fixed in the first recess and is in tight contact with an outer wall of the connecting pipe; and a second recess is formed on an outer surface of the connecting pipe, and a second sealing ring is fixed in the recess and is in tight contact with an inner wall of the outlet port.

15. The fuel supply device according to claim 13, wherein a handle is fixed on the top of the fuel tank, and a protective cover is hinged on a side of the handle; and the protective cover is rotatable to fit the top of the fuel tank and completely cover a top of the controller.

16. The fuel supply device according to claim 15, wherein the protective cover comprises a flat end and an extended end arranged in an L-shape; and a slide groove is formed in a middle portion of the extended end, with one side of the slide groove facing away from the flat end open to the outside, and when the flat end fits the top of the fuel tank, the threaded connector extends into the slide groove.

17. The fuel supply device according to claim 16, wherein an edge of the slide groove extends outward to form a rib, with a length of the rib flush with the threaded connector, and mounting holes are symmetrically arranged on both sides of the rib below the threaded connector;

a connecting ring is fixed at a position on a surface of the fuel tank corresponding to an inner side of the rib, and when the flat end is fitted to the top of the fuel tank, the mounting holes lie on a same plane as the center of the connecting ring, with a combination lock movably inserted between the mounting holes and the connecting ring.

18. The fuel supply device according to claim 13, further comprising a fuel nozzle, wherein the fuel nozzle is equipped with an oil delivery pipe and is connected to the threaded connector through the oil delivery pipe.

19. The fuel supply device according to claim 18, wherein an inlet pipe is fixed on the top of the fuel tank, and a tank cap is threadedly installed on an outer wall of the inlet pipe; and a through opening is formed at the center of the tank cap, a vent valve is integrally molded on an inner wall of the opening, and a screw rod is threadedly installed on an inner wall of the vent valve.

20. The fuel supply device according to claim 19, wherein a spacer is sleeved on the inlet pipe, a fitting sleeve is fixed on the spacer, and the fuel nozzle is movably engaged within the fitting sleeve.

\* \* \* \* \*